May 2, 1961

E. DRISKELL ET AL 2,982,232

CANDY CANE MACHINE

Filed Oct. 24, 1957

INVENTORS
*Earnest Driskell* and
*James T. Spratling*
BY
*Mason, Fenwick & Lawrence*
ATTORNEYS May 2, 1961
E. DRISKELL ET AL
2,982,232
CANDY CANE MACHINE
Filed Oct. 24, 1957
2 Sheets-Sheet 2
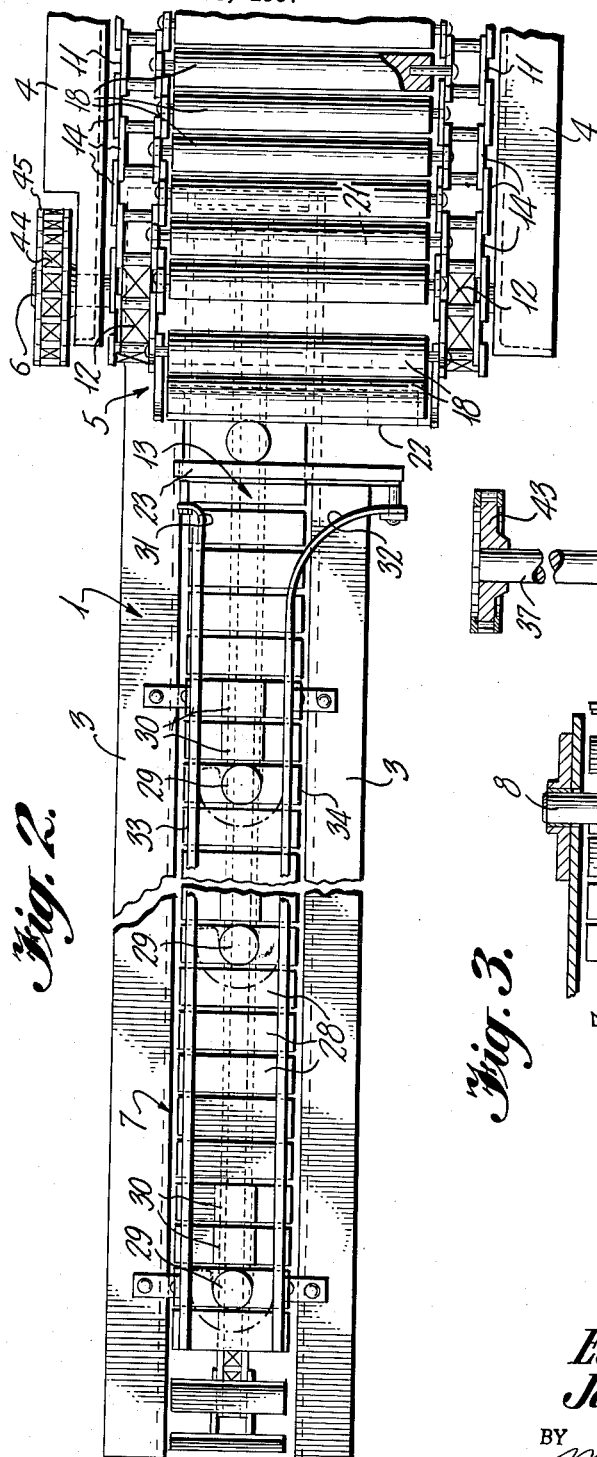
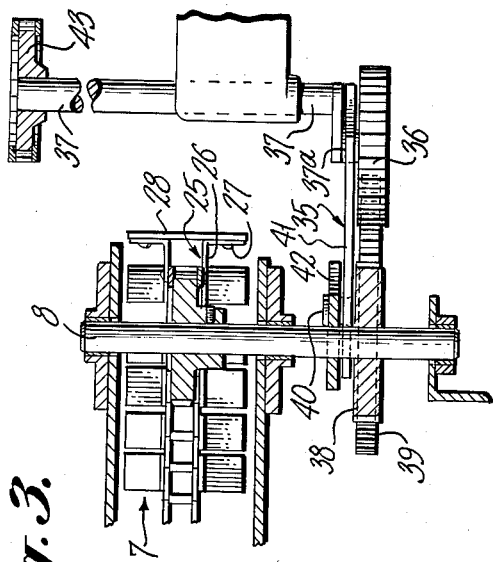
INVENTORS
*Earnest Driskell* and
*James T. Spratling*
BY
*Mason, Fenwick & Lawrence*
ATTORNEYS _United States Patent Office_

2,982,232
Patented May 2, 1961

2,982,232

CANDY CANE MACHINE

Earnest Driskell and James T. Spratling, Albany, Ga., assignors to Bobs Candies, Inc., Albany, Ga., a corporation of Georgia Filed Oct. 24, 1957, Ser. No. 692,202

4 Claims. (Cl. 107—8)

This invention relates to candy shaping mechanism, and more particularly to mechanism for forming crooks in the ends of sticks of candy to produce so-called candy canes.

Candy canes have been made in several ways, first by hand and later by machinery. Most of the machines have been relatively complicated, requiring numerous parts and, therefore, have been difficult to maintain, both from the standpoint of cleaning and repair. With some machines, excessive breakage of the candy has occurred.

The primary object of the present invention is to provide mechanism for forming candy canes which will be simple, efficient and require little or no upkeep.

A more specific object of the present invention is the provision of such mechanism wherein the candy sticks will have a unidirectional movement through the entire path, even though the shape and position of the stick may change.

Another object of the invention is to provide cane shaping mechanism wherein the only moving parts are the feed chains which carry the candy from inlet to outlet.

Other objects of the invention will become apparent from the following description of one practical embodiment thereof, when taken in conjunction with the drawings which accompany, and form part of, this specification.

In the drawings:

Figure 2 is a top plan view of the mechanism shown in Figure 1;

Figure 3 is a horizontal section taken on the line 3—3 of Figure 1; and

Figures 1, 4:
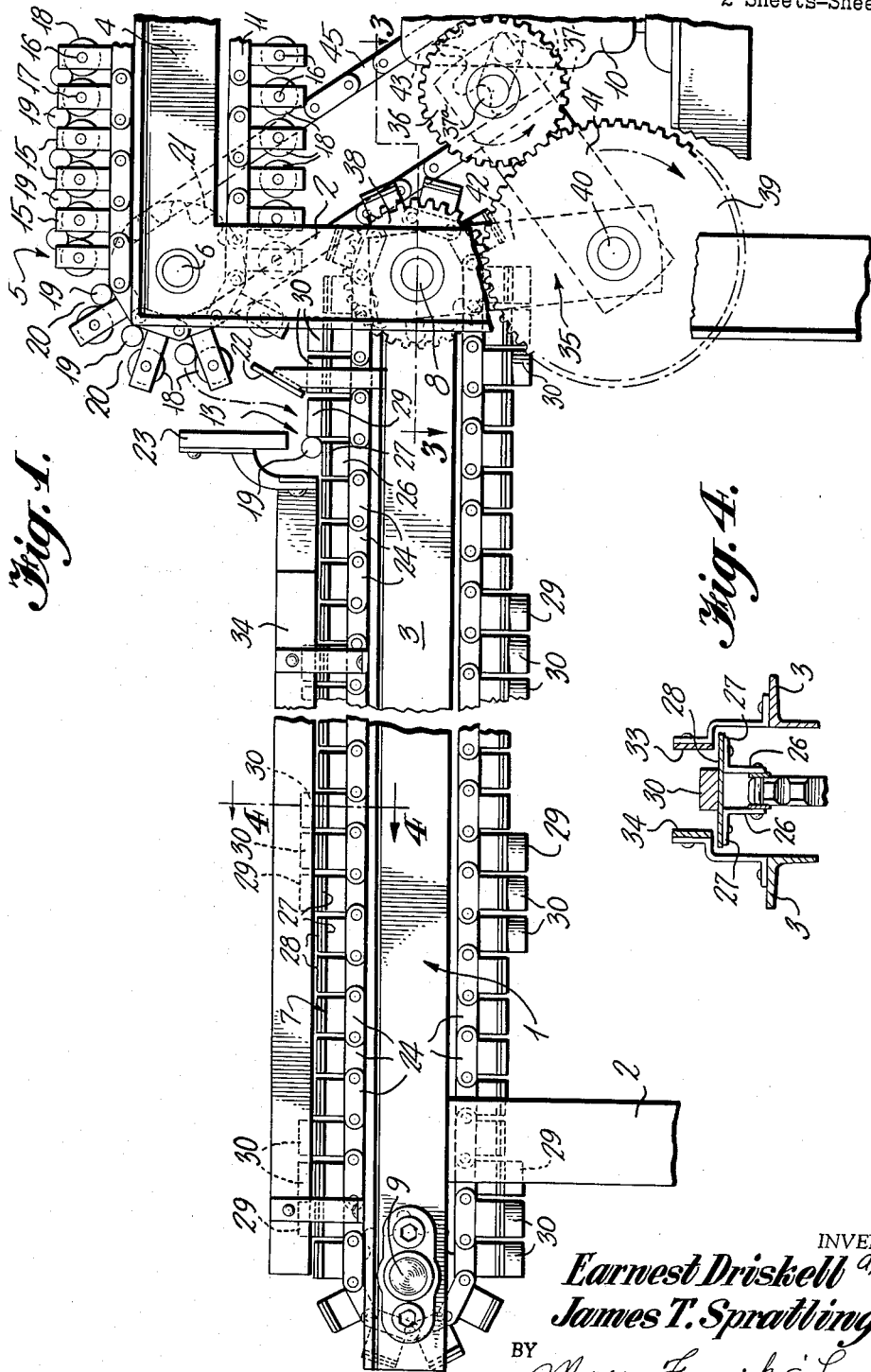
Figure 1 is a side elevation of mechanism for shaping candy canes and incorporating the principles of the present invention.
Figure 4 is a transverse section through the punch chain taken on the line 4—4 of Figure 1.

In general, the mechanism includes a conveyor for feeding straight, bendable candy sticks to a bending station where a punch chain picks up the sticks singly and moves them against a bending die which causes the sticks to conform to punches carried by the chain. Means are provided to move the punch chain slowly during the bending step and quickly thereafter to remove the formed cane from the bending area.

Referring to the drawings in detail, the mechanism is shown as mounted upon a frame 1, of any conventional type, which may have vertical members 2 connected by longitudinal, horizontally extending, side frames 3 and 4. A feed conveyor 5 is mounted upon a shaft 6, journalled in the frame member 4, and a punch chain 7 is mounted upon axles 8 and 9, journalled in the frame member 3. Both the feed conveyor and punch chain are driven from a power source 10, the feed conveyor at uniform speed and the punch chain at a varying rate as will be described.

The feed conveyor consists of a pair of transversely spaced chains 11 mounted upon sprockets 12 fixed to the shaft 6. The conveyor may extend from any source of supply of hot, bendable candy sticks to the sprockets 12 adjacent a bending station 13. The outer end of the conveyor adjacent the candy source, will also be mounted upon suitable sprockets (not shown). The chains will be composed of links 14 having lugs 15 rising therefrom, each of which is drilled, as at 16, to receive a trunnion 17 projecting from the end of a roller 18. Opposite trunnions will be mounted in opposite chain links so that the roller will span the gap between the chains. The diameter of the rollers is sufficient to lie in substantial contact with one another during the upper stick-supporting flight. This will permit the candy sticks 19 to lie in the recesses 20 formed by the declining adjacent upper surfaces of adjacent rollers. These recesses, or pockets, lie normal to the path of travel of the chains and will hold the candy sticks in proper position for release to the die chain.

As the links pass around the sprockets 12 they will turn out of the straight path of the upper chain flight and the lugs 15 will separate to extend radially to the sprockets. This will separate the rollers 18, permitting the candy sticks to drop between them. In order that the sticks will not fall completely through the conveyor, a drum 21 is mounted on the shaft 6 and extends from one chain to the other. The sticks 19 fall on the surface of the drum and rest against the drum and the roller on the link ahead of the stick. This puts the stick behind the roller, and the roller serves to hold the stick in the pocket until the stick has travelled a considerable distance around the sprocket and is closely adjacent the bending station. Thus, the stick will not be released by the feed chain at a high point. This prevents breakage, bending, and other deformation of the stick during transfer to the punch chain.

When the sticks fall from the feed conveyor they roll down an inclined plate 22, supported by the frame members 3. A suitable guard 23, also supported from the frame, is used to prevent dropping sticks from falling outside the transfer area. The lower edges of plate 22 and guard 23 are rather close together to define a guide to ensure the sticks falling upon the punch chain in the same transverse position they occupied on the feed conveyor.

The punch chain has one end underlying the discharge end of the feed conveyor, and the chain extends as a straight-line continuation of the conveyor. Each of the chain links 24 has upwardly extending, oppositely disposed, right angular lugs 25, having vertical legs 26 and horizontal legs 27, with the horizontal legs lying in a common horizontal plane while the links are on the top or operative flight of the chain. Rectangular plates 28 are fixed to the tops of each pair of lugs 25 to form a platform to support candy sticks transferred from the feed conveyor. When the sticks fall on the platform they are carried along to the bending station.

Certain of the plates 28, at equally spaced points along the chain, are provided with vertical, cylindrical punch members 29, affixed to the centers of the plates and projecting there above a sufficient distance to engage sticks of candy on the platform. On the next succeeding plate or plates to the rear of the plates carrying the die members, rectangular punch members, or guides, 30 are fixed. These have the same width as the diameter of the punch members 29, and are to engage the staffs of the canes after the crooks are formed, as will be described. One or more of these guides may be used, depending upon the lengths of the canes being formed.

As the sticks are carried forward on the platform, they will be brought into abutment with die forming members 31 and 32, carried by the frame members 3 and located at equal distances on opposite sides of the center line of the die chain. The leading ends of the die-forming members are in a vertical plane normal to the path of travel of the chain. Abutment 31 of the die is much smaller than abutment 32 and its curvature is much more abrupt. It will be noted that the center line of chain 7 is to one side of the center line of the feed conveyor and the sticks of candy deposited on the plates 28 will overhang the plates more on one side than the other. Die-forming member 31 contacts the short end of the candy stick to bend it quickly about the punch member 29, while die-forming member 32 contacts the long end of the stick and bends it slowly about punch 29 and against the punch members 30. Die-forming members 31 and 32 are located at the ends of retaining walls 33 and 34, respectively, which are secured to frame members 3, and confine the bent stick to its desired shape during its travel on the chain 7.

In order to eliminate breakage of the sticks during bending yet expedite removal of formed canes from the bending area, chain 7 is driven by a power transmitting means 35 which will provide a varying speed. This consists of a driving gear 36, mounted on a crank throw 37a formed on the end of a drive shaft 37 of the power source 10, a driven gear 38 on punch chain shaft 8, and and idler gear 39 in mesh with gears 36 and 38 and mounted on stub shaft 40. Gears 36 and 38 are of equal size, while gear 39 is much larger. Connecting links 41 and 42 hold the gears in assembled relation. Link 41 is journalled on the throw 37a of shaft 37 and on shaft 40, and link 42 on shafts 40 and 8. This mounting will permit bodily movement of the gears relative to one another while maintaining them in mesh. Gear 36 is fixedly mounted on the crank throw 37a. When shaft 37 rotates, gear 36 will be caused to move in a circular orbit about the axis of the shaft. This will cause gear 36 to roll about the periphery of gear 39 and gear 39 to roll about the periphery of gear 38, while transmitting rotative movement from one to the other. This will cause low rotative speed of gear 38 during one phase of the orbital movement of gear 36 and high speed driving the other phase, as is well known in the art.

Feed conveyor 5 is also driven from the power source 10, sprockets 43 and 44 in shafts 37 and 7 carrying chain 45 being shown to transmit the power. The timing of the feed conveyor and punch chain must be such that a stick of candy will fall from the feed conveyor at the transfer point upon the punch chain platform just ahead of each of the cylindrical punch members 29.

In operation, hot bendable candy sticks will be placed upon the feed conveyor 5, one in each recess 20, and moved by the conveyor to the transfer point. As the conveyor passes around the sprockets 12, the rollers will separate permitting the sticks to fall upon the drum 21 and behind the leading roller. The roller will provide support to the stick as the drum rotates to prevent its premature falling from the conveyor. When the candy has travelled around the curve, considerably beyond the horizontal plane, it will override the roller and drop on the platform of the punch chain. Due to the staggered relation of the two transporting members, the sticks will be crosswise of, and offset with respect to, the punch chain platform. The punch chain will advance each stick slowly until it is in contact with the die-forming abutments 31 and 32 and the punch member 29 is bearing against its opposite side between the points of contact with the die. This will assure perfect alignment of the stick before bending. Still moving slowly, the punch member will press the stick, causing it to bow, between the abutments. Continued movement will bring the stick closely around the punch and the semi-circular crook will be formed. The remaining length of the stick will be pressed against the sides of the guides 30. The chain will pick up speed and quickly draw the formed cane away from the bending station and between the retaining walls 33 and 34. This operation is repeated as the candy sticks are fed to the machine. Finished canes may be taken from the chain 7 or they may be transported to any desirable delivery point.

While in the above one practical embodiment of the invention has been disclosed, it will be understood that the precise details of construction described and shown are merely by way of illustration and the invention may take other forms within the scope of the appended claims.

What is claimed is:

1. A mechanism for shaping straight candy sticks to form candy canes compripsing, a frame, a pair of fixed spaced abutments on the frame forming a die, means to deliver straight candy sticks singly to a position with one end portion bridging the die, and means including a punch movable along a path intersecting the candy stick position and through said die, whereby movement of the punch along said path will force the end of the sticks to bend about the punch and the stick to be drawn through the die, said means including a punch comprising a link chain, plates on the links to form a platform to support candy sticks when on the operative flight of the chain, and said punch mounted upon one of the plates, means to move said chain along said path slowly while said punch is approaching and passing through said die and then increase the chain speed.

2. A mechanism for shaping straight candy sticks to form candy canes comprising, a frame, a pair of fixed spaced abutments on the frame forming a die, means to deliver straight candy sticks singly to a position with one end portion bridging the die, and means including a punch movable along a path intersecting the candy stick position and through said die, whereby movement of the punch along said path will force the end of the sticks to bend about the punch and the stick to be drawn through the die, said means to deliver candy sticks to the die comprising a pair of spaced chains, and a plurality of rollers bridging the space between the chains and mounted in close proximity, whereby a pair of adjacent rollers form between them a recess to support a candy stick, said delivery means being offset laterally relative to the die so that one end portion of sticks delivered by said delivery means will bridge the die.

3. A mechanism for shaping straight candy sticks to form candy canes comprising, a frame, a punch chain mounted on the frame having punches spaced therealong, means carried by the frame forming a passageway in alignment with and above the punch chain, means forming a throat converging to the end of the passageway, means to move the punch chain to cause the punches to move into the throat and along the passageway, and means to deliver candy sticks to the punch chain in front of the throat including, a pair of feed chains spaced apart and parallel to the punch chain, rollers carried by the feed chains with their axes normal to the path of chain travel and adjacent rollers in close proximity to support a candy stick beween them, and means to advance the feed chains, the delivery means being offset laterally from the throat to an extent so that candy sticks delivered in front of the throat will have one end portion lying across the throat.

4. A mechanism for shaping straight candy sticks to form candy canes as claimed in claim 3 wherein the feed chains are above the punch chain and the feed chains pass around sprockets above and adjacent the throat, means bridging the sprockets and underlying the feed chains as they pass around the sprockets and forming a continuous surface underlying the rollers as the feed chains pass around the sprockets, said rollers each being connected to opposed individual links of the feed chains and being spaced above said chains, whereby articular movement of the feed chain links in passing around the sprockets will cause bodily movement and separation of the rollers to allow candy sticks carried between the rollers to fall upon the underlying surface, and a guideway adjacent the throat and the sprockets into which candy sticks may fall from the feed chains to be guided to lodge transversely of the throat.

References Cited in the file of this patent

UNITED STATES PATENTS

| | | |
|---|---|---|
| 757,870 | High | Apr. 19, 1904 |
| 1,192,336 | Mueller | July 25, 1916 |
| 1,836,349 | Westerfield | Dec. 15, 1931 |
| 2,246,420 | Strongin | June 17, 1941 |
| 2,486,450 | Wahl | Nov. 1, 1949 |
| 2,827,862 | Genich | Mar. 25, 1958 |

FOREIGN PATENTS

| | | |
|---|---|---|
| 590,317 | France | June 15, 1925 |